US007562299B2

(12) United States Patent
Millar et al.

(10) Patent No.: US 7,562,299 B2
(45) Date of Patent: Jul. 14, 2009

(54) METHOD AND APPARATUS FOR SEARCHING RECORDED VIDEO

(75) Inventors: Greg Millar, Coarsegold, CA (US); Ryan Haning, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 368 days.

(21) Appl. No.: 10/918,184

(22) Filed: Aug. 13, 2004

(65) Prior Publication Data

US 2006/0034586 A1 Feb. 16, 2006

(51) Int. Cl.
G06F 3/00 (2006.01)
G06F 13/00 (2006.01)

(52) U.S. Cl. .................... 715/719; 715/765; 715/835; 715/846; 348/143

(58) Field of Classification Search ................ 715/700, 715/716, 717, 719, 764, 765, 781, 804, 835, 715/846, 810; 348/143, 152, 153
See application file for complete search history.

(56) References Cited

U.S. PATENT DOCUMENTS

| | | | | |
|---|---|---|---|---|
| 5,917,958 | A * | 6/1999 | Nunally et al. | 382/276 |
| 6,144,375 | A * | 11/2000 | Jain et al. | 715/500.1 |
| 6,486,896 | B1 * | 11/2002 | Ubillos | 715/784 |
| 6,618,074 | B1 * | 9/2003 | Seeley et al. | 348/143 |
| 6,756,998 | B1 * | 6/2004 | Bilger | 715/764 |
| 6,871,107 | B1 * | 3/2005 | Townsend et al. | 700/94 |
| 6,996,782 | B2 * | 2/2006 | Parker et al. | 715/764 |
| 7,068,842 | B2 * | 6/2006 | Liang et al. | 382/181 |
| 2002/0097322 | A1 * | 7/2002 | Monroe et al. | 348/159 |
| 2003/0081120 | A1 * | 5/2003 | Klindworth | 348/143 |
| 2003/0122874 | A1 * | 7/2003 | Dieberger et al. | 345/764 |
| 2003/0202772 | A1 * | 10/2003 | Dow et al. | 386/46 |
| 2004/0039934 | A1 * | 2/2004 | Land et al. | 713/200 |
| 2004/0085296 | A1 * | 5/2004 | Soloviev | 345/163 |
| 2004/0197088 | A1 * | 10/2004 | Ferman et al. | 386/117 |
| 2004/0199826 | A1 * | 10/2004 | Bertram et al. | 714/37 |
| 2005/0033758 | A1 * | 2/2005 | Baxter | 707/100 |
| 2005/0041734 | A1 * | 2/2005 | Walker et al. | 375/240.01 |
| 2005/0091596 | A1 * | 4/2005 | Anthony et al. | 715/712 |
| 2005/0132414 | A1 * | 6/2005 | Bentley et al. | 725/105 |
| 2005/0151846 | A1 * | 7/2005 | Thornhill | 348/149 |
| 2005/0286428 | A1 * | 12/2005 | Oksanen et al. | 370/241 |

OTHER PUBLICATIONS

"Visual Surveillance System 1.0", Clarity Visual Intelligence, www.clarityvi.com, 2004, 8 pages.*
"Analyzing Video", dTective, www.oceansystems.com, 6 pages.*
Dr. G. T. Poulton, "Face Recognition in Open Environments: Developments at CSIRO", Proceedings of 2001 International Symposium on Intelligent Multimedia, Video and Speech Processing, May 2-4, 2001, pp. 494-497.*

* cited by examiner

*Primary Examiner*—X. L Bautista
(74) *Attorney, Agent, or Firm*—Paul T. Kashimba, Esq.

(57) ABSTRACT

A method of searching recorded video from a surveillance camera comprising the steps of displaying a first timeline representing a first period of time, using a first user input to select a first time on the first timeline, using a second user input to display a second timeline, said second timeline having a shorter duration of time than said first timeline, using a third user input to select a second time on the second timeline, and using a fourth user input to display the video that was recorded at the second time.

28 Claims, 7 Drawing Sheets

METHOD AND APPARATUS FOR SEARCHING RECORDED VIDEO

CROSS-REFERENCE TO RELATED APPLICATION

N/A

STATEMENT REGARDING FEDERALLY SPONSORED RESEARCH OR DEVELOPMENT

N/A

BACKGROUND OF THE INVENTION

This invention relates to surveillance systems and, in particular, to a method of and apparatus for searching recorded video in a video surveillance system.

Video surveillance systems normally include a recorder for recording the video captured by the surveillance cameras. Initially, videocassette recorders were used for recording this data; however, the tapes could only be searched by having personnel review the tapes to find the portion of interest. This process was extremely time consuming and labor intensive. The development of digital video recorders improved the searching process with the use of algorithms to search for specific items, such as when an item has disappeared from the area being viewed by the video camera. However, the ability to quickly and easily find a specific video clip has not significantly improved; the process still requires personnel to review the video as with VCR tapes. Accordingly, there has been a long felt need in the art for a system and method of quickly searching through recorded video data to locate the video of interest.

SUMMARY OF THE INVENTION

In accordance with the present invention there is provided a method of searching recorded video from a surveillance camera comprising the steps of displaying a first timeline representing a first period of time, using a first user input to select a first time on the first timeline, using a second user input to display a second timeline, the second timeline having a shorter duration of time than the first timeline, using a third user input to select a second time on the second timeline, and using a fourth user input to display the video that was recorded at the second time.

The present invention also provides an apparatus for searching recorded video from a surveillance camera comprising a display, a storage device for storing recorded video; a processor, and a user input device. The processor generates a first signal to display a first timeline representing a first period of time on the display. A user input device provides a first user input to the processor for selecting a first time on the first timeline and a second user input to the processor. In response to the second user input, the processor generates a second signal to display a second timeline on the display. The second timeline has a shorter duration of time than the first timeline. The user input device provides a third user input to select a second time on the second timeline and a fourth user input to select the display of video that was recorded at the second time. The processor accesses the storage device in response to the fourth user input to generate a signal to display the video that was recorded at the second time on the display.

In addition, the present invention provides a method of searching recorded video from a surveillance camera comprising the steps of displaying a first timeline representing a first period of time, using a first user input to select a first time on the first timeline, using a second user input to display a second timeline, the second timeline having a shorter duration of time than the first timeline, using a third user input to select a start point on the second timeline for recorded video to be exported, using a fourth user input to select an end point on the second timeline for recorded video to be exported, and using a fifth user input to initiate the exporting of the video data for the time period from the start point to the end point.

The present invention provides a quick and easy way to search recorded video to identify dates and times of recorded events and display those events or export them. A plurality of video recordings from a plurality of cameras can be displayed at one time with these recordings being synchronized so that all of the displayed videos were recorded at the same point in time.

Other advantages and applications of the present invention will be made apparent by the following detailed description of the preferred embodiment of the invention.

DETAILED DESCRIPTION OF THE INVENTION

Figure 1:
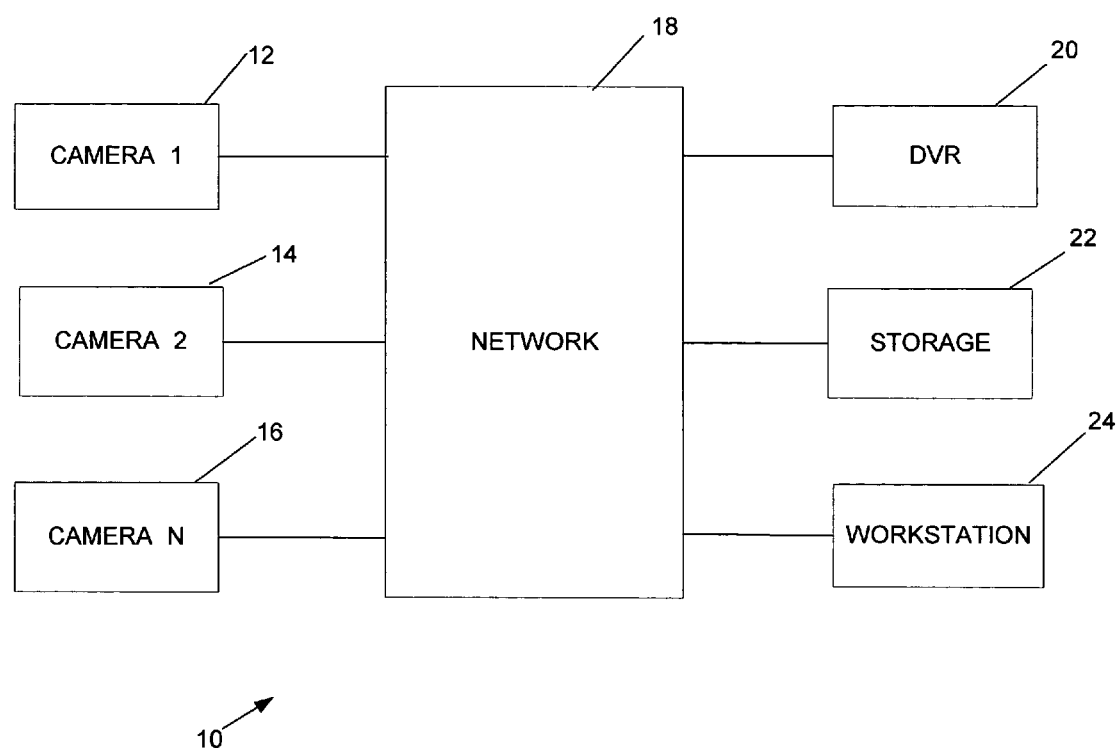
FIG. 1 is a block diagram of a video surveillance system utilizing the present invention.

Referring to FIG. 1, a video surveillance system 10 is shown in block diagram form. Video surveillance system 10 comprises a plurality of cameras from 1 through n, which are labeled 12, 14, and 16, connected to a network 18. Network 18 can be a closed network, local area network or wide area network, such as the Internet. A digital video recorder 20 is also connected to network 18 for recording the video from cameras 12, 14, and 16. If desired, video surveillance system 10 can include a plurality of digital video recorders, which can be network video recorders or digital video recorders which can be connected directly to a display or workstation. As used herein, recorded video includes full-motion video and still photographs taken at intervals. Storage 22 is connected to network 18 to provide additional storage for recorded video which can be transferred from DVR 20 for short-term or long-term storage. Storage 22 can be connected to network 18 as shown or directly to DVR 20, such as an expansion box. Workstation 24 is connected to network 18 to provide a user with a display and input capability. Workstation 24 can be a general purpose computer with software for implementing the present invention and provide a graphical user interface for searching recorded video data or it can be simply a display and user input device for accessing video surveillance system 10 and utilizing the video data search capabilities of the present invention. The graphical user interface software for searching the recorded video data can reside anywhere in the system such as, for example, DVR 20 or storage 22.

Figure 2:
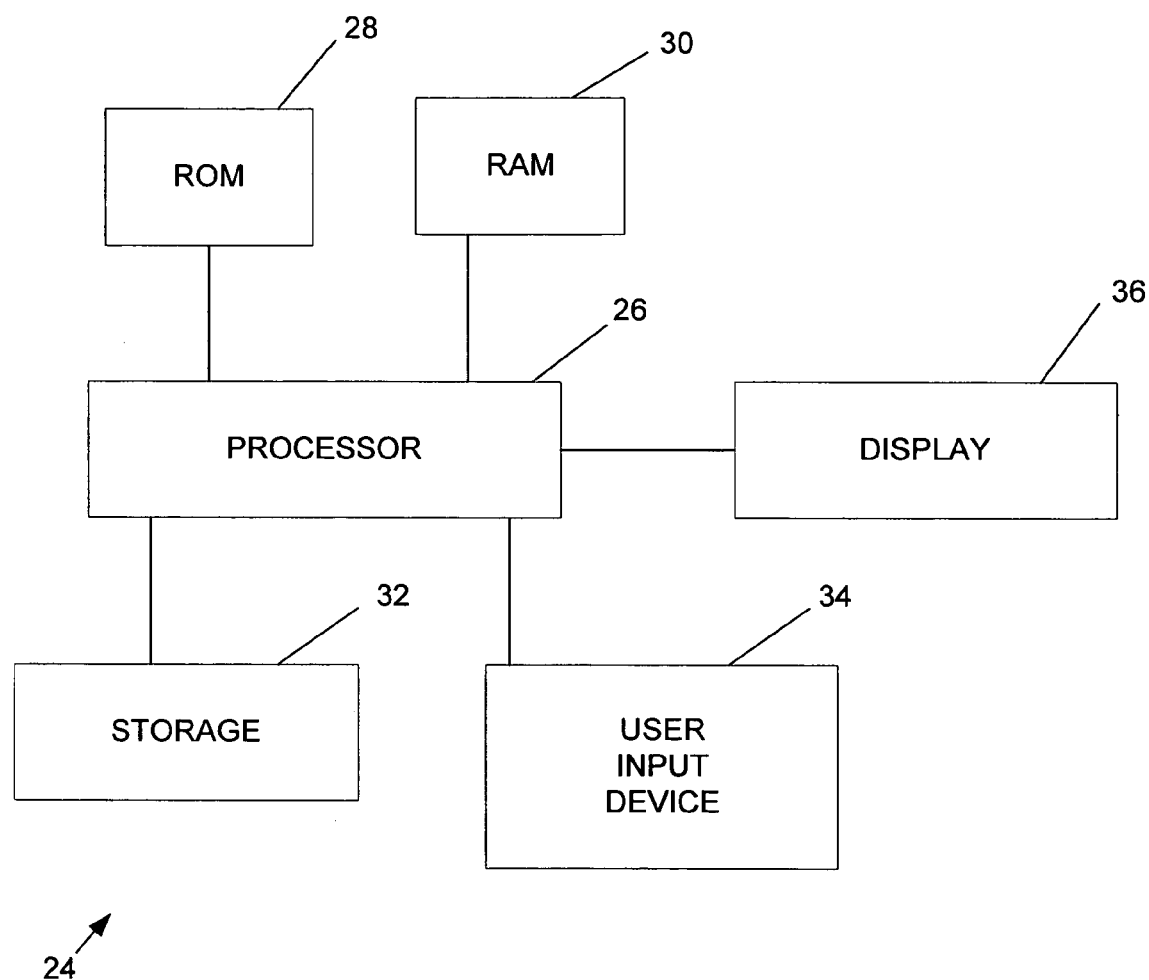
FIG. 2 is a block diagram of a workstation utilizing the present invention.

FIG. 2 illustrates one embodiment of workstation 24 for implementing the present invention. Processor 26 is connected to ROM 28, RAM 30, and storage 32, which can be a hard disk drive, compact disc drive, optical drive, and the like. Processor 26 implements a software program for displaying a graphical user interface that is stored in ROM 28 or storage 32. Processor 26 provides output signals to display 36 to display the graphical user interface for implementing the present invention. User input device 34 can be a mouse, jog/shuttle controller, keyboard, or other suitable input device connected to processor 26 to provide user input to search the stored video data according to the present invention. The recorded video data searched by workstation 24 can be stored in DVR 20 or storage 22 of video surveillance system 10, or in storage 32.

Figure 3:
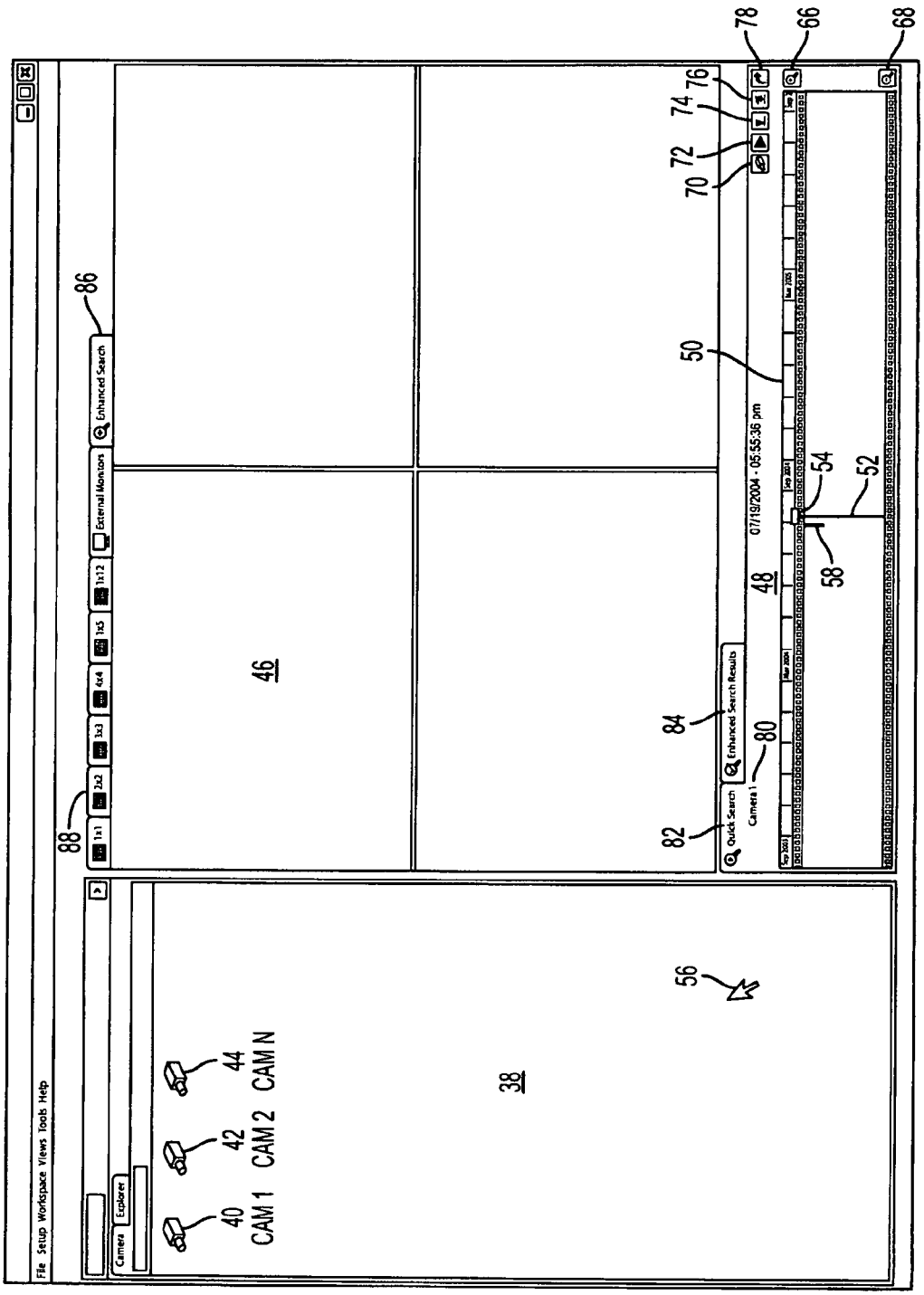
FIG. 3 is a diagrammatic view of a screen display for implementing the present invention.

A graphical user interface for implementing the present invention is displayed in FIG. 3. Window 38 contains icons 40, 42, and 44, which graphically represent cameras 12, 14, and 16 from FIG. 1. Window 46 is the area for the display of recorded video. Window 46 is shown in quad mode, i.e., a two by two matrix in which a different camera could be displayed in each quadrant; however, other configurations can be used as well as is known in the art. Window 48 contains a time graph 50 which, by way of example, shows the time period from September 2003 to September 2005. Line 52 shows the chosen point in time on time graph 50. For illustration purposes, line 52 is shown at time Jul. 19, 2004—05:55:36 pm. Line 52 can be moved, for example, by using a mouse to move pointer 56 onto slider 54, clicking a mouse button and moving slider 54 to the desired time and then releasing the mouse button. The scale of time graph 50 can be changed by the user, for example, by rotating the wheel on a mouse.

Figure 4:
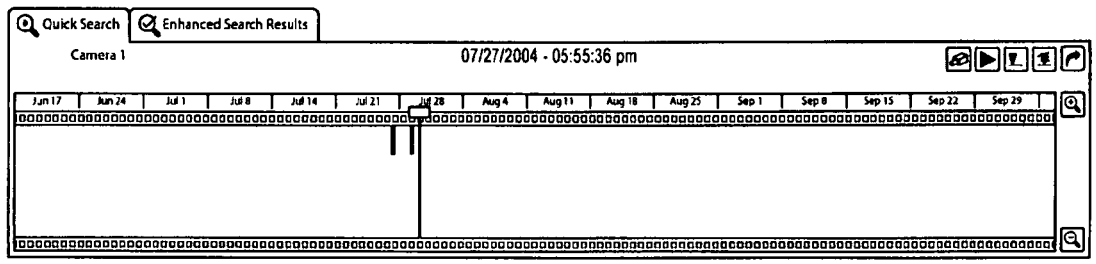
FIG. 4 is a diagrammatic view of a window from a screen display for implementing the present invention.
Figure 5:
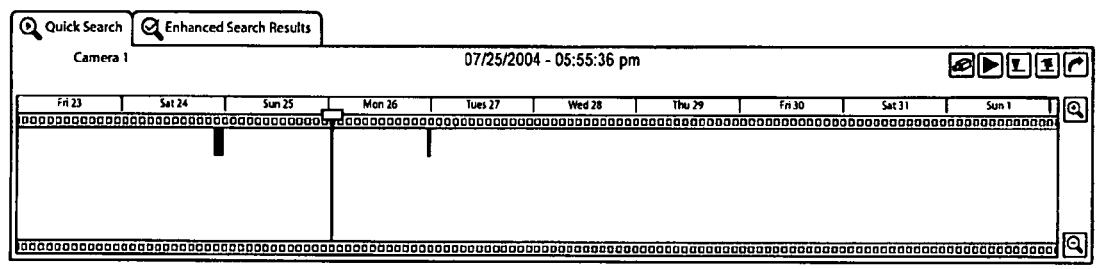
FIG. 5 is a diagrammatic view of a window from a screen display for implementing the present invention.
Figure 6:
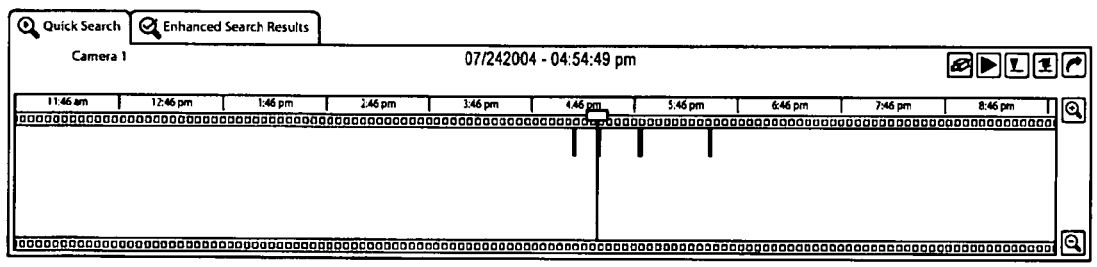
FIG. 6 is a diagrammatic view of a window from a screen display for implementing the present invention.
Figure 7:
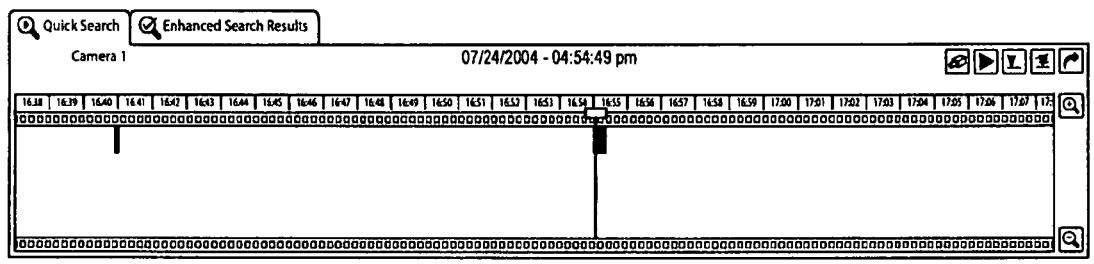
FIG. 7 is a diagrammatic view of a window from a screen display for implementing the present invention.
Figure 8:
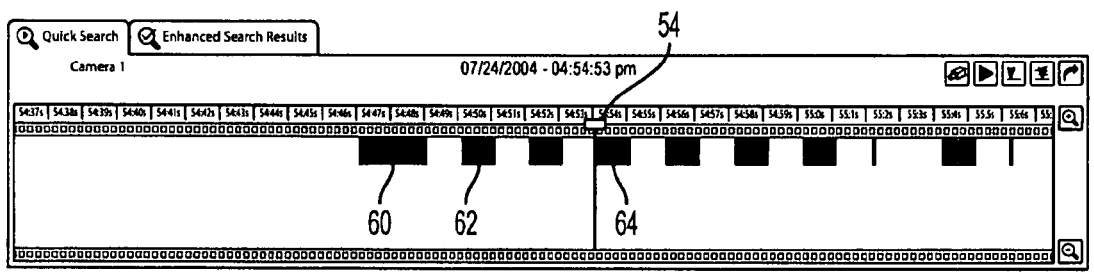
FIG. 8 is a diagrammatic view of a window from a screen display for implementing the present invention.

The scale of time graph 50 can be changed from years as shown in FIG. 3 to months, days, hours, minutes, and seconds as shown respectively in FIGS. 4-8. FIG. 4 shows the time period on time graph 50 from Jun. 17 through Sep. 29 of 2004. FIG. 5 shows the time period on time graph 50 from Jul. 23 through Aug. 1 of 2004. FIG. 6 shows the time period on time graph 50 from 11:46 am through 8:46 pm of Jul. 24, 2004. FIG. 7 shows the time period on time graph 50 from 16:38 pm through 17:07 pm, i.e., 4:38 pm through 5:07 pm of Jul. 24, 2004. FIG. 8 shows the time period on time graph 50 from 4:54:37 pm through 4:55:06 pm of Jul. 24, 2004. As the mouse wheel is rolled, time graph 50 changes to the next scale or farther with a fluid motion. At the same time, slider 54 can be moved along time graph 50 to the desired point in time. If the mouse wheel is rotated in the opposite direction, time graph 50 changes to the next longer period of time, such as from seconds to minutes, or farther depending upon the amount of rotation of the mouse wheel. Accordingly, the user can move through time by moving slider 54 back and forth across time graph 50 and rotating the mouse wheel to zoom in or out in time as desired.

The scale of time graph 50 can be changed in other ways, such as by moving pointer 56 to icon 66 to go to a scale showing a shorter time period such as from hours to minutes or by moving pointer 56 to icon 68 to go to a scale showing a longer time period such as from hours to days.

Bar 58 indicates that video was recorded at that time. The width of bar 58 indicates the length of the recorded video, and depending upon the scale of time graph 50, varying degrees of detail of recorded video are shown. This can be seen clearly by referring to FIG. 8 where bar 60 indicates a segment of recorded video that is significantly longer than bar 62. Depending upon the scale, bars 60 and 62 may be indicated as a single bar as the user zooms out in time or may not be shown at all. In addition, bar 58 can be displayed in different colors to indicate different types of recordings, such as an alarm event, motion detection event, or continuous recording such as on a recorded schedule.

Other user input devices can be used to interact with the graphical user interface, such as a jog/shuttle controller, keyboard and similar devices. Once slider 54 has been moved to the point of interest as shown in FIG. 8, the video segment of interest indicated by bar 64 can be displayed by clicking the mouse button. This process can be implemented in a number of ways, for example, by clicking the left or right mouse button, double clicking one of the mouse buttons or any other user input to signal processor 26 to retrieve and play the desired video.

The user selects the video data to be searched by selecting the camera of interest. The user moves pointer 56 onto the desired icon, i.e. one of icons 40, 42, and 44, clicks and holds a mouse button, drags the selected camera icon to time graph 50, and then releases the mouse button to indicate to processor 26 that data for the selected camera should be displayed on time graph 50. Other methods can be used for selecting the camera, for example, pointer 56 can be moved to icon 70 and the mouse button clicked to indicate to processor 26 that the user wishes to select a camera. The user then moves pointer 56 to one of icons 40, 42, or 44 and selects the desired camera to be active on time graph 50. Icon 72 can be used to indicate to processor 26 that the video recorded at the time selected on time graph 50 should be displayed.

In addition, the system and method of the present invention facilitates the exporting of selected video. The desired video can be searched as previously described. Once slider 54 has been moved to the beginning of the desired video clip, pointer 56 is moved to icon 74 and activated by a click of a mouse button. Slider 54 is then moved to the end of the desired video clip. Pointer 56 is then moved to icon 74 and activated again by a click of a mouse button to provide user input to processor 26 indicating the end of the video clip to be exported. Pointer 56 is then moved to icon 78, and the user then clicks a mouse button to indicate to processor 26 to retrieve the selected video data from storage 32, storage 22, or DVR 20, and provide the video data to the device selected by the user, for example, to a compact disc drive for recording on a compact disc or to network 18 for transmitting to another location connected to network 18. To remove the export designations placed by the foregoing process, the user moves pointer 56 to icon 76 and clicks a mouse button.

Window 48 includes an indication of which camera is currently active on time graph 50. Numeral 80 points to this indication, which is shown for illustration purposes as Camera 1. Window 48 also contains an indication of the type of search is being displayed in window 46. Numeral 82 indicates that a Quick Search is currently active, referring to the use the functions associated with time bar 50. In addition, other types of searches can be performed by special algorithms, and is indicated by numeral 84 referring to Enhanced Search Results, which can be activated by moving pointer 56 to box 86 and clicking a mouse button. In addition, different screen configurations can be chosen by placing pointer 56 on the desired configuration, such as a 2×2 screen displayed indicated by numeral 88. Any number of other screen configurations for window 46 can also be used, such as 1×1, 3×3, 4×4, 1×5, and 1×12 or other suitable screen configuration to meet the user's information display needs.

Multiple cameras can be selected and displayed in separate quadrants of window 46 with all of the displayed video being video that was recorded at the chosen point in time. The video streams are recorded separately along with an indication of the time the video was recorded. The cameras are synchronized by a system clock for surveillance system 10 that can reside in workstation 24, DVR 20 or any suitable location on network 18 so that any combination of cameras can be selected for viewing the recordings at a selected point in time. This function can be implemented, for example, by using pointer 56 to drag the additional cameras to the desired quadrant of window 46 to indicate to processor 26 that the user also wants to view the recorded video, if any, from the additionally selected cameras that was recorded at the selected time on time graph 50.

Figure 9:
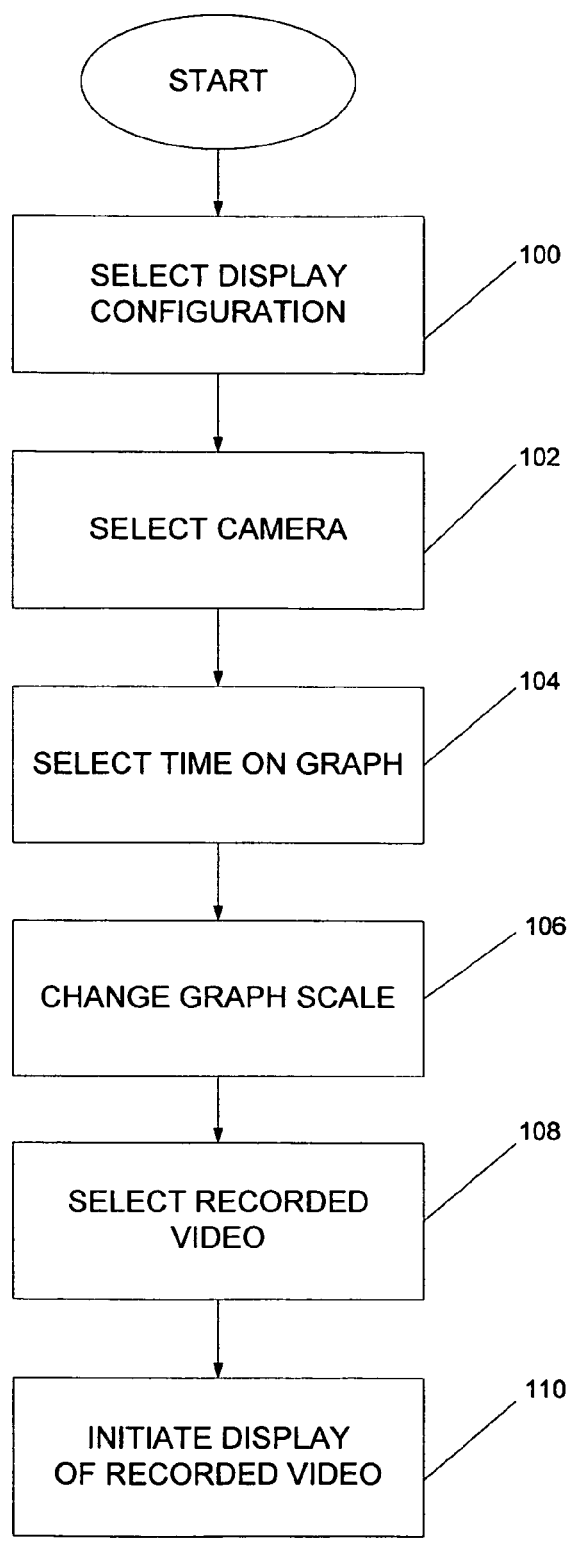
FIG. 9 is a flowchart illustrating a process for implementing the present invention.

FIG. 9 illustrates the steps that a user goes through in utilizing the present invention. At block 100, the user selects a display configuration for the video display window, for example, 2×2, as shown in FIG. 3. The user then selects the camera of interest to search the recorded video on time graph 50. At blocks 104, 106, and 108, the user then moves slider 54 back and forth and zooms in or out in scale to select the time on time graph 50 at which the recorded video is to be displayed. At block 110, the user provides a user input signal, such as clicking a mouse button to indicate to processor 26 that the display of the selected recorded video should be initiated.

Figure 10:
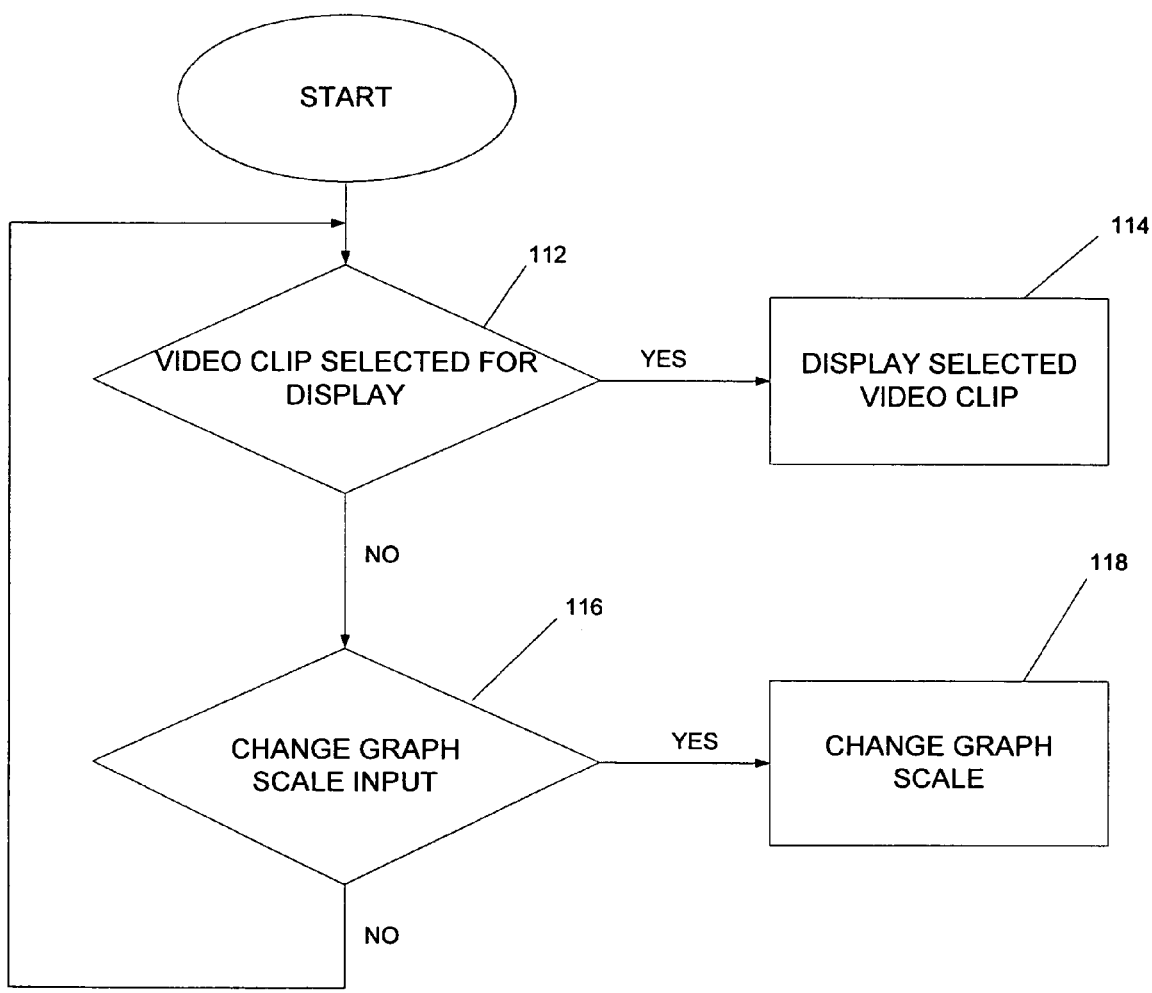
FIG. 10 is a flowchart illustrating a process for implementing the present invention.

FIG. 10 illustrates the steps that processor 26 performs in waiting for, receiving, and responding to user input when the search function of the present invention has been initiated. At decision point 112, processor 26 waits for an input from a user indicating that a video clip has been selected for display. If the appropriate user input is received, processor 26 displays the selected video clip at block 114. If the appropriate user input is not received at decision point 112, processor 26 checks to see if a change graph scale input has been received from a user at decision point 116. If the appropriate user input is received, at block 118 processor 26 changes the graph scale. If the appropriate user input is not received at decision point 116, then processor 26 returns to decision point 112 and the process continues until the search function has been discontinued by the user.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method of searching recorded video from a camera comprising the steps of: displaying a first timeline representing a first period of time of recorded video on a graphical user interface; using a first user input to select a first time on the first timeline by moving a pointer along the first timeline; using a second user input that does not require the user to interface with the graphical user interface to generate a second timeline, the second timeline representing a second period of time within the first period of time and having a shorter duration of time than the first period of time and containing all of the video information for the second period of time that was contained in the same time period in the first period of time; replacing the first timeline with the second timeline; using a third user input to select a second time on the second timeline; and using a fourth user input to display the video that was recorded at the second time.

2. A method as recited in claim 1 further comprising the step of providing indications on the first and second timelines when video was recorded.

3. A method as recited in claim 2 wherein said providing step comprises providing indications that indicate the lengths of video recorded.

4. A method as recited in claim 2 wherein said providing step comprises providing an indication of the type of event that was recorded.

5. A method as recited in claim 1 further comprising the steps of displaying the first timeline in a first window and displaying the recorded video in a second window.

6. A method as recited in claim 1 further comprising the steps of selecting a plurality of cameras and displaying video that was recorded at the second time by the plurality of cameras so that the video from the plurality of cameras is synchronized on the display thereby allowing a user to simultaneously view the video from the selected plurality of cameras that was recorded at the second time.

7. A method as recited in claim 6 further comprising the steps of creating a plurality of windows in the display, creating a plurality of icons in the display representing video cameras, and wherein said step of selecting a plurality of video cameras comprises selecting an icon in the display and dragging the selected icon to one of the plurality of windows for each of the selected plurality of video cameras.

8. A method as recited in claim 1 further comprising the steps of using a fifth user input to display a third timeline, said third timeline having a shorter duration of time than said second timeline; replacing the second timeline with the third timeline; using a sixth user input to select a third time on the third timeline; and using a seventh user input to display the video that was recorded at the third time.

9. A method as recited in claim 1 wherein said step of using a second user input to generate a second timeline comprises the step of changing the scale on the second timeline.

10. A method as recited in claim 9 wherein said step of changing the scale on the second timeline comprises changing the scale to a scale selected from the group of from months to days, from days to hours, from hours to minutes, and from minutes to seconds.

11. A method as recited in claim 10 wherein said step of changing the scale on the second timeline comprises the step of rotating a mouse wheel to change the scale on the second timeline.

12. A method as recited in claim 1, wherein said step of using a first user input and said step of using a second user input can be done at the same time.

13. An apparatus for searching recorded video from a camera comprising: a display; a storage device for storing recorded video; a processor for generating a first signal to display a first timeline representing a first period of time of recorded video on said display in a graphical user interface; a user input device for providing a first user input to said processor for selecting a first time on said first timeline by moving a pointer along the first timeline and for providing a second user input to said processor that does not require the user to interface with the graphical user interface, said processor generating a second signal to display a second timeline on said display in response to said second user input and replacing said first timeline with said second timeline, said second timeline representing a second period of time within the first period of time and having a shorter duration of time than said first period of time and containing all of the video information for the second period of time that was contained in the same time period in said first period of time, said user input device providing a third user input to select a second time on said second timeline and a fourth user input to select the display of video that was recorded at said second time, said processor accessing said storage device in response to said fourth user input to generate a signal to display the video that was recorded at said second time on said display.

14. An apparatus as recited in claim 13 wherein said processor generates a signal to display said first and second timelines with indications of when video was recorded.

15. An apparatus as recited in claim 14 wherein said indications have widths that indicate the lengths of recorded video.

16. An apparatus as recited in claim 14 wherein said indications have different colors to indicate the type of event that was recorded.

17. An apparatus as recited in claim 13 wherein said processor generates a signal to display said first timeline in a first window and the recorded video in a second window.

18. An apparatus as recited in claim 13 wherein said processor is responsive to user input to enable a user to select a plurality of cameras and generates a signal to display video that was recorded at said second time by the selected plurality of surveillance cameras so that the video from the plurality of cameras is synchronized on the display thereby allowing a user to simultaneously view the video from the selected plurality of cameras that was recorded at the second time.

19. An apparatus as recited in claim 18 wherein said processor generates a display having a plurality of windows and a plurality of icons representing a plurality of cameras and wherein said processor enables a user to select an icon from the plurality of icons to select a camera and to place that icon in one of the plurality of windows to display the video recorded from the selected camera.

20. An apparatus as recited in claim 13 wherein said user input device comprises a mouse.

21. An apparatus as recited in claim 13 wherein said user input device comprises a jog/shuttle.

22. An apparatus as recited in claim 13, wherein said user input device comprises a keyboard.

23. An apparatus as recited in claim 13 wherein said second timeline has a different scale than said first timeline.

24. An apparatus as recited in claim 23 wherein said processor changes the scale on said second timeline to a user selected scale from the group of from months to days, from days to hours, from hours to minutes and from minutes to seconds.

25. An apparatus as recited in claim 24 wherein said second user input comprising rotation of a mouse wheel.

26. An apparatus as recited in claim 13, wherein said first and second user inputs can be done at the same time.

27. A method of searching recorded video from a surveillance camera comprising the steps of: displaying a first timeline representing a first period of time of recorded video on a graphical user interface; using a first user input to select a first time on the first timeline by moving a pointer along the first timeline; using a second user input that does not require the user to interface with the graphical user interface to generate a second timeline, the second timeline representing a second period of time within the first period of time and having a shorter duration of time than the first period of time and containing all of the video information for the second period of time that was contained in the same time period in the first period of time; replacing the first timeline with the second timeline; using a third user input to select a start point on the second timeline for recorded video to be exported; using a fourth user input to select an end point on the second timeline for recorded video to be exported; and using a fifth user input to initiate the exporting of the video data for the time period from the start point to the end point.

28. A method as recited in claim 27, wherein said step of using a first user input and said step of using a second user input can be done at the same time.

* * * * *